US012664606B2

(12) United States Patent
Wu et al.

(10) Patent No.: US 12,664,606 B2
(45) Date of Patent: Jun. 23, 2026

(54) VIDEO CROPPING METHOD AND APPARATUS, STORAGE MEDIUM AND ELECTRONIC DEVICE

(71) Applicant: BEIJING YOUZHUJU NETWORK TECHNOLOGY CO. LTD., Beijing (CN)

(72) Inventors: Hao Wu, Beijing (CN); Changhu Wang, Beijing (CN)

(73) Assignee: BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 341 days.

(21) Appl. No.: 18/255,473

(22) PCT Filed: Dec. 1, 2021

(86) PCT No.: PCT/CN2021/134720
§ 371 (c)(1),
(2) Date: Jun. 1, 2023

(87) PCT Pub. No.: WO2022/116990
PCT Pub. Date: Jun. 9, 2022

(65) Prior Publication Data
US 2024/0112299 A1    Apr. 4, 2024

(30) Foreign Application Priority Data
Dec. 2, 2020    (CN) .......................... 202011401449.0

(51) Int. Cl.
*G06T 3/04* (2024.01)
*G06T 3/4007* (2024.01)

(52) U.S. Cl.
CPC .............. *G06T 3/04* (2024.01); *G06T 3/4007* (2013.01)

(58) Field of Classification Search
CPC ................................. G06T 3/04; G06T 3/4007
See application file for complete search history.

(56) References Cited

U.S. PATENT DOCUMENTS

2013/0050574 A1    2/2013  Lu et al.
2015/0116350 A1    4/2015  Lin et al.
(Continued)

FOREIGN PATENT DOCUMENTS

CN    104836956 A    8/2015
CN    110189378 A  *  8/2019  ............... G06T 7/20
(Continued)

OTHER PUBLICATIONS

ISA China National Intellectual Property Administration, Written Opinion for International Application No. PCT/CN2021/134720, mailed Feb. 17, 2022, 9 Pages.
(Continued)

*Primary Examiner* — Wednel Cadeau
(74) *Attorney, Agent, or Firm* — Alleman Hall LLP

(57) ABSTRACT

This disclosure relates to a video cropping method and apparatus, storage medium, and electronic device. The present disclosure method: acquiring an original video to be cropped; performing frame extraction processing on the original video to obtain a plurality of target video frames; determining, for each of the target video frames, a target candidate cropping box corresponding to the target video frame according to a main content in the target video frame; performing interpolation processing according to the target candidate cropping box corresponding to each of the target video frames to determine a target cropping box corresponding to each frame picture in the original video; and cropping the original video according to the target cropping box corresponding to the each frame picture.

11 Claims, 4 Drawing Sheets

(56) References Cited

U.S. PATENT DOCUMENTS

2021/0185273 A1* 6/2021 Pitts .................... H04N 7/0122
2021/0287009 A1 9/2021 Hu et al.

FOREIGN PATENT DOCUMENTS

CN 111356016 A 6/2020
CN 111586473 A 8/2020
CN 111815645 A 10/2020
CN 112565890 A 3/2021
WO WO-2020150267 A1 * 7/2020 ........... H04N 19/593

OTHER PUBLICATIONS

China National Intellectual Property Administration, Notice of Allowance Issued in Application No. 202011401449.0, Aug. 23, 2022, 6 pages.
ISA China National Intellectual Property Administration, International Search Report Issued in Application No. PCT/CN2021/134720, Feb. 17, 2022, WIPO, 4 pages.

* cited by examiner cropping box cropping box

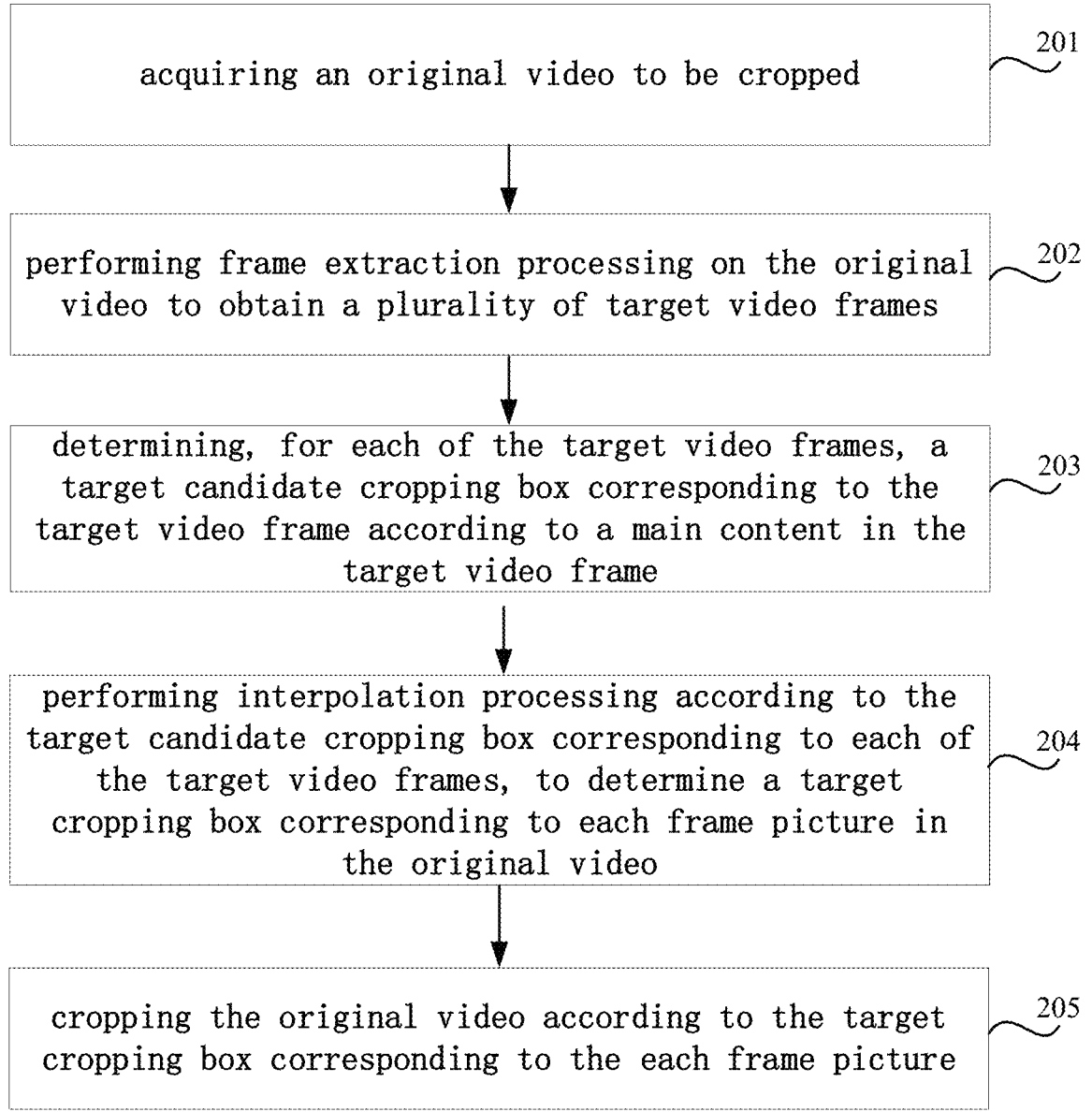

acquiring an original video to be cropped ⌇201 performing frame extraction processing on the original ⌇202
video to obtain a plurality of target video frames determining, for each of the target video frames, a ⌇203
target candidate cropping box corresponding to the
target video frame according to a main content in the
target video frame performing interpolation processing according to the
target candidate cropping box corresponding to each of ⌇204
the target video frames, to determine a target
cropping box corresponding to each frame picture in
the original video cropping the original video according to the target ⌇205
cropping box corresponding to the each frame picture

Fig. 2 cropping box          cropping box

VIDEO CROPPING METHOD AND APPARATUS, STORAGE MEDIUM AND ELECTRONIC DEVICE

CROSS-REFERENCE TO RELATED APPLICATIONS

This application is a U.S. National Stage Application under 35 U.S.C. § 371 of PCT International Application No. PCT/CN2021/134720 filed on Dec. 1, 2021, which is based on and claims the priority to the Chinese patent application No. 202011401449.0 filed to the China National Intellectual Property Administration on Dec. 2, 2020, the disclosure of both of which are hereby incorporated in its entirety into the present application.

TECHNICAL FIELD

This disclosure relates to the technical field of video processing, and in particular, to a video cropping method and apparatus, storage medium, and electronic device.

BACKGROUND

Video intelligent cropping is a technology required in a scenario where a video playing size is inconsistent with that of an original video. A video intelligent cropping algorithm in the related art is typically to use cropping boxes of a same size to crop each frame picture in a video, and then recombine cropped each frame picture into a video.

SUMMARY

The "SUMMARY" part is provided to introduce concepts in a simplified form, which will be described in detail below in the following "DETAILED DESCRIPTION OF THE DRAWINGS" part. The "SUMMARY" part is not intended to identify key features or essential features of the claimed technical solutions, nor is it intended to limit the scope of the claimed technical solutions.

In a first aspect, the present disclosure provides a video cropping method, comprising:

acquiring an original video to be cropped;
  performing frame extraction processing on the original video to obtain a plurality of target video frames;
  determining, for each of the target video frames, a target candidate cropping box corresponding to the target video frame according to a main content in the target video frame;
  performing interpolation processing according to the target candidate cropping box corresponding to each of the target video frames to determine a target cropping box corresponding to each frame picture in the original video; and
  cropping the original video according to the target cropping box corresponding to the each frame picture.

In a second aspect, the present disclosure provides a video cropping apparatus, comprising:

an acquisition module configured to acquire an original video to be cropped;
  a frame extraction module configured to perform frame extraction processing on the original video to obtain a plurality of target video frames;
  a determination module configured to determine, for each of the target video frames, a target candidate cropping box corresponding to the target video frame according to a main content in the target video frame;

an interpolation module configured to perform interpolation processing according to the target candidate cropping box corresponding to each of the target video frames to determine a target cropping box corresponding to each frame picture in the original video; and
  a cropping module configured to crop the original video according to the target cropping box corresponding to the each frame picture.

In a third aspect, the present disclosure provides a computer-readable medium having stored thereon computer programs which, when executed by a processing means, implement the steps of the method in the first aspect.

In a fourth aspect, the present disclosure provides an electronic device comprising:

a storage means having computer programs stored thereon;
  a processing means configured to execute the computer programs in the storage means to implement the steps of the method in the first aspect.

Other features and advantages of the present disclosure will be explained in detail in the following "DETAILED DESCRIPTION" part.

BRIEF DESCRIPTION OF THE DRAWINGS

The above and other features, advantages, and aspects of embodiments of the present disclosure will become more apparent in conjunction with the accompanying drawings and with reference to the following "DETAILED DESCRIPTION" part. Throughout the drawings, identical or similar reference numbers refer to identical or similar elements. It should be understood that the drawings are schematic and that components and elements are not necessarily drawn to scale. In the drawings:

FIG. 2 is a flow diagram illustrating a video cropping method according to one exemplary embodiment of the present disclosure;

DETAILED DESCRIPTION

Figure 1:
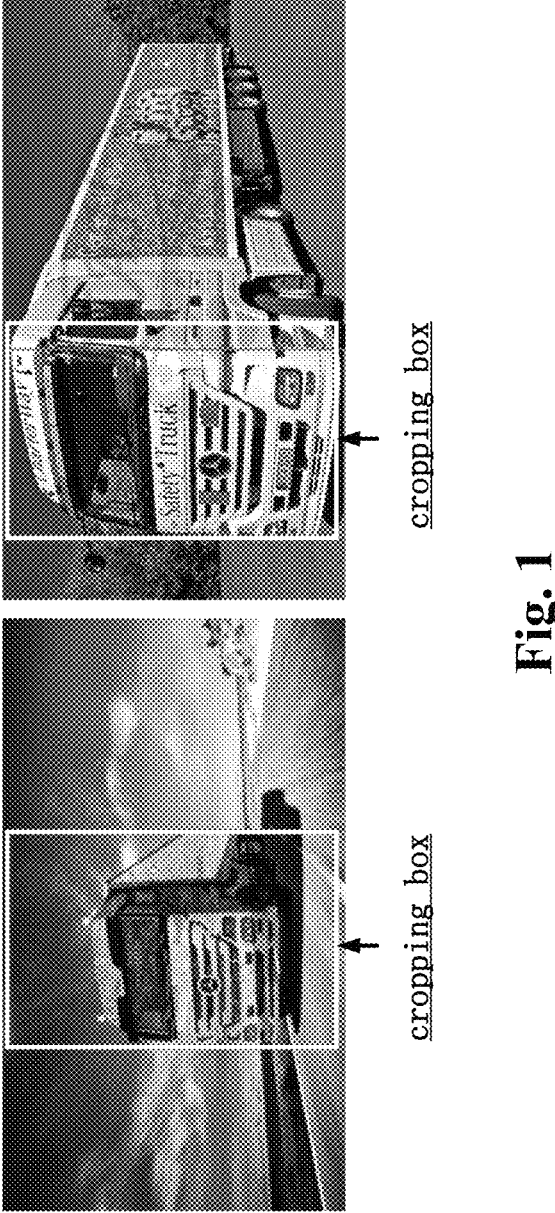
FIG. 1 is a schematic diagram of a video cropping method in related art.

The embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein, and on the contrary, these embodiments are provided for a more thorough and complete understanding of the present disclosure. It should be understood that the drawings and the embodiments of the present disclosure are for illustration only and are not intended to limit the protection scope of the present disclosure.

It should be understood that various steps recited in method embodiments of the present disclosure can be performed in a different order, and/or in parallel. Moreover, the method embodiments can include an additional step and/or omit performing an illustrated step. The scope of the present disclosure is not limited in this respect.

The term "comprise" and variations thereof used herein are intended to be open-minded, i.e., "comprising but not limited to". The term "based on" is "at least partially based on". The term "one embodiment" means "at least one embodiment"; the term "one other embodiment" means "at least one other embodiment"; the term "some embodiments" means "at least some embodiments". Relevant definitions for other terms will be given in the following description.

It should be noted that the concepts such as "first", "second", mentioned in the present disclosure are only used for distinguishing different devices, modules or units, and are not used for limiting order or interdependence of functions performed by the devices, modules or units. In addition, it should be noted that the modifications of "one" and "more" in this disclosure are intended to be illustrative rather than limiting, and those skilled in the art should understand that they should be understood as "one or more" unless otherwise explicitly stated in the context.

Names for messages or information exchanged between devices in the embodiments of the present disclosure are for illustration only, and are not intended to limit the scope of the messages or information.

As mentioned in the "BACKGROUND" part, a video cropping algorithm in the related art is typically to use cropping boxes of a same size to crop each frame picture in a video, and then recombine cropped each frame picture into a video. However, there may be a great difference in content information contained in the each frame picture in the video, and if the each frame picture is cropped using the cropping box of the same size, it may result in loss of most of picture contents, which affects quality of the cropped video. For example, two images shown in FIG. 1 are two frame pictures in one same video (with a size of 16:9), both of which are cropped using cropping boxes with a size of 9:16. For the left image, the cropping box of this size can include most of the main contents in the picture. However, for the right image, regardless of at which location in the picture cropping is performed using the cropping box with this size, it will result in loss of most of the main contents, so that quality of the cropped video is affected.

In view of this, the present disclosure provides a video cropping method, apparatus, a storage medium, and an electronic device, to solve the above problems in the video cropping process in the related art, for the purpose of dynamically adjusting a size of a corresponding cropping box according to the main contents in a different target video frame, to retain most of the main contents of each frame picture in an original video, and to upgrade quality of a cropped video.

FIG. 2 is a flow diagram illustrating a video cropping method according to one exemplary embodiment of the present disclosure. Referring to FIG. 2, the video cropping method can comprise the following steps:

step 201, acquiring an original video to be cropped.

Exemplarily, a user can enter a URL (Uniform Resource Locator) corresponding to an original video in an electronic device, and then the electronic device can download the original video from a corresponding resource server according to the URL for video cropping. Alternatively, an electronic device can, in response to a video cropping request triggered by the user, acquire a stored video from a memory as an original video for video cropping, and so on, wherein the acquisition manner of the original video is not limited in the embodiment of the present disclosure.

Step 202, performing frame extraction processing on the original video to obtain a plurality of target video frames.

Exemplarily, the frame extraction processing can be that part of video frames are extracted from each video frame corresponding to the original video as the target video frames. This can reduce calculations in subsequent processing processes, and improve efficiency of video cropping. Of course, if calculations and efficiency are not considered, the frame extraction processing can also be that all the video frames corresponding to the original video are extracted as the target video frames, which is not limited in the embodiments of the present disclosure.

Step 203, determining, for each of the target video frames, a target candidate cropping box corresponding to the target video frame according to a main content in the target video frame.

Exemplarily, the main content can be a main picture content occupying most of an image area, for example, a vehicle in FIG. 1 is the main content of the video frame. For each of the target video frames, the main content can be determined by at least one of the following detection modes: saliency detection, human face detection, text detection, or logo detection. The saliency detection is used for detecting a location of a main component of the target video frame. The human face detection is used for detecting a location of a human face in the target video frame. The text detection is used for detecting a location of text in the target video frame and content of the text. The logo detection is used for detecting a location of a content such as a logo and a watermark in the target video frame. In addition, before the main content is detected, border detection can also be performed on the target video frame first, and then detected useless borders such as black borders and Gaussian blur are removed to improve accuracy of subsequent detection of the main content.

Exemplarily, Each of the target video frames can correspond to a plurality of candidate cropping boxes, and then a target candidate cropping box can be determined from the plurality of candidate cropping boxes according to the main content in the target video frame, wherein the target candidate cropping box can include the main content in the target video frame, so that loss of most of the main content in the cropped video can be improved to upgrade quality of the video cropping.

Step 204, performing interpolation processing according to the target candidate cropping box corresponding to each of the target video frames, to determine a target cropping box corresponding to each frame picture in the original video.

Exemplarily, the interpolation processing can be that interpolation calculation is performed according to a location coordinate of the target candidate cropping box corresponding to each of the target video frames, to obtain a location coordinate of a target cropping box corresponding to other frame pictures in the original video. A specific interpolation processing manner is similar to that in the related art, and thus is not repeated here. For a size of the target cropping box corresponding to the other frame pictures, it can be determined according to a size of the target candidate cropping box, that is, the size of the target cropping box corresponding to the other frame pictures is the same as that of the target candidate cropping box.

In a possible implementation, before the interpolation processing, smoothing denoising processing can also be performed on the target candidate cropping box to improve accuracy of the result. That is to say, smoothing processing can be performed according to the target candidate cropping box corresponding to each of the target video frames, to obtain a smooth candidate cropping box corresponding to each of the target video frames, then the interpolation processing is performed according to the smooth candidate cropping box corresponding to each of the target video frames to obtain the target cropping box corresponding to the each frame picture in the original video. The smoothing processing on the target candidate cropping box can be performed in any smoothing denoising manner in the related art, for example, by a Gaussian filter, and the like, which is not limited in the embodiment of the present disclosure.

Step 205, cropping the original video according to the target cropping box corresponding to the each frame picture.

Exemplarily, a length and width of a corresponding frame picture in the original video can be respectively cropped according to the target cropping box. Alternatively, in order to improve efficiency of the video cropping, the length or width of the corresponding frame picture can be cropped according to the size of the target cropping box and the size of the original video. For example, if the size of the target cropping box is 1:1, and the size of an original video is 720×1280 pixels, the length (along a y-axis direction) of the corresponding frame picture can be cropped, and the cropped video has a size of 720×720 pixels.

Exemplarily, after the original video is cropped according to the target cropping box corresponding to the each frame picture, cropped each frame picture can be re-spliced into a video to obtain a cropped video, and then the cropped video can be displayed to the user.

Figure 3:
FIG. 3 is a schematic diagram illustrating cropping in a video cropping method according to one exemplary embodiment of the present disclosure.

In the above manner, the target candidate cropping box corresponding to each of the target video frames can be dynamically determined according to the main content in each of the target video frames, so that a different target cropping box for the each frame picture can be determined by the interpolation processing. For example, referring to FIG. 3, two images shown in FIG. 3 are two frame pictures in one same video (with a size of 16:9). According to the video cropping method in the embodiment of the present disclosure, for the left image, cropping is performed by a cropping box with a size of 9:16, so that the main content in the frame picture can be included. For the right image, cropping is performed by a cropping box with a size of 16:9, so that the main content in the frame picture can be included. Compared with the video cropping method in the related art, loss of most of the main content in the cropped video can be improved, thereby upgrading quality of the video cropping.

In a possible implementation, the determining, for each of the target video frames, a target candidate cropping box corresponding to the target video frame according to a main content in the target video frame can be: calculating, for each of the target video frames, a cost function according to the main content in the target video frame and a plurality of candidate cropping boxes corresponding to the target video frame, and then determining, among the plurality of candidate cropping boxes, a target candidate cropping box that minimizes a calculation result of the cost function. The cost function comprises a first function for characterizing importance of the main content in the target video frame and a second function for characterizing a size difference between candidate cropping boxes in two target video frames.

Exemplarily, the plurality of candidate cropping boxes corresponding to the target video frame can be determined by: for each of the target video frames, taking a preset cropping box as an initial candidate cropping box, and moving the candidate cropping box according to a preset location offset to obtain a new candidate cropping box location, until a border of the candidate cropping box coincides with the target video frame or exceeds the target video frame. The preset location offset can be set according to an actual situation, which is not limited in the embodiment of the present disclosure. For example, the preset location offset can be set to 20 pixel points, and in this case, an initial candidate cropping box can be moved laterally (or moved longitudinally) by 20 pixel points to obtain a new candidate cropping box, then the new candidate cropping box is moved laterally (or moved longitudinally) by 20 pixel points again to obtain a new candidate cropping box, and so on, until a border of the candidate cropping box coincides with or exceeds the target video frame. Therefore, the plurality of candidate cropping boxes corresponding to the target video frame can be obtained.

In a possible implementation, the first function can be calculated by: determining, for each candidate cropping box, a content inclusion degree of the candidate cropping box to the main content in the target video frame, and determining a content proportion between main content included in the candidate cropping box and the complete main content in the target video frame, and then calculating the first function according to the content inclusion degree and the content proportion.

Exemplarily, the content inclusion degree can be a ratio between the main content included in the candidate cropping box and an area of the candidate cropping box, that is, the content inclusion degree can be understood as a main content inclusion degree in the candidate cropping box per unit area. The content proportion can be a ratio between the main content included in the candidate cropping box and the complete main content in the target video frame, that is, a result obtained by comparing the main content included in the candidate cropping box to the complete main content in the target video frame.

In a possible implementation, an expression of the first function is:

$$f = 1 - \left( \beta_1 \frac{A(C_i)}{S(C_i)} + \beta_2 \frac{A(C_i)}{A(I_i)} \right)$$

where $f$ denotes a calculation result of the first function, $\beta_1$ and $\beta_2$ denote preset weight values, $A(C_i)$ denotes a main content included in a candidate cropping box $C_i$ corresponding to an ith target video frame, $S(C_i)$ denotes an area of the candidate cropping box $C_i$ corresponding to the ith target video frame, $A(I_i)$ denotes a complete main content in the ith target video frame, $$\frac{A(C_i)}{S(C_i)}$$

denotes a content inclusion degree of the candidate cropping box $C_i$ corresponding to the ith target video frame to the main content in the ith target video frame, and $$\frac{A(C_i)}{A(I_i)}$$

denotes a content proportion between the main content included in the candidate cropping box $C_i$ corresponding to the ith target video frame and the complete main content in the ith target video frame.

Exemplarily, a calculation formula for $A(C_i)$ can be: $A(C_i)=S(C_i) \cdot G(C_i) \cdot F(C_i)$, where $S(C_i)$ denotes a static saliency score obtained according to a static saliency detection result, $G(C_i)$ denotes a dynamic saliency score obtained according to a dynamic saliency detection result, and $F(C_i)$ denotes a human face score obtained according to a human face detection result.

Exemplarily, the preset weight value can be determined according to an actual situation, which is not limited in the embodiment of the present disclosure, as long as the preset weight value is a numerical value greater than 0 and less than 1. By means of the preset weight values, calculated weights of the content inclusion degree and the content proportion in the calculation process of the first function can be adjusted, so that the content inclusion degree and the content proportion are balanced with each other. Of course, in a possible implementation, the first function can be calculated not using the preset weight values, that is, the expression of the first function can also be:

$$f = 1 - \left( \frac{A(C_i)}{S(C_i)} + \frac{A(C_i)}{A(I_i)} \right)$$

The first function is calculated in any of the above manners, and the less the area of the candidate cropping box, the greater the content inclusion degree, thus the less the first function, and the less the cost function. Meanwhile, the greater the content proportion, the less the first function, thus the less the cost function. Therefore, according to the above formula, calculating the first function by the content inclusion degree and the content proportion enables the target candidate cropping box to include the main content, and the target candidate cropping box is as small as possible, thereby improving the problem that the target candidate cropping box becomes a box including the whole target video frame picture so that the video cropping cannot be performed.

In a possible implementation, the second function can be calculated by: determining a width difference and a length difference between a candidate cropping box in a first target video frame and a candidate cropping box in a second target video frame, wherein the first target video frame is an adjacent previous one video frame of the second target video frame, and then calculating the second function according to the width difference and the length difference. Exemplarily, an expression of the second function can be: $|W_i - W_{i-1}| + |H_i - H_{i-1}|$, where $W_i$ denotes a width of the candidate cropping box corresponding to the ith target video frame, $W_{i-1}$ denotes a width of a candidate cropping box corresponding to an (i−1)th target video frame, $H_i$ denotes a length of the candidate cropping box corresponding to the ith target video frame, $H_{i-1}$ denotes a length of the candidate cropping box corresponding to the (i−1)th target video frame. Alternatively, a weight intervention can also be added in the calculation process of the second function to facilitate the calculation, that is, the expression of the second function can also be: $\lambda_1 \cdot (|W_i - W_{i-1}| + |H_i - H_{i-1}|)$. Where $\lambda_1$ denotes a preset weight value, a numerical value of $\lambda_1$ can be set according to an actual situation, which is not limited in the embodiment of the present disclosure, as long as the preset weight value is a numerical value greater than 0 and less than 1.

The second function can be used to constrain the sizes of the target candidate cropping boxes of adjacent two frames to be as close as possible, which can ensure a smooth change in the target candidate cropping boxes, such that the cropped video pictures will not suddenly become large or small, thereby upgrading quality of the cropped video.

In other possible implementations, the cost functions can further comprise a text energy function and a lens smoothing penalty function, which are consistent with those in the related art and are briefly described here.

Exemplarily, the text energy function can be used for charactering a situation where the candidate cropping box covers text in the target video frame, and an expression for the text energy function can be: $x(1-x)$, where X denotes a coverage rate of the candidate cropping box to a text detection box, i.e., a result of an area of the text detection box covered by the candidate cropping box being divided by an area of the text detection box. Alternatively, a weight intervention can be added to the text energy function to facilitate the calculation, that is, the expression of the text energy function can also be: $\lambda_2 \cdot (x(1-x))$. Where $\lambda_2$ denotes a preset weight value, a numerical value of $\lambda_2$ can be set according to an actual situation, which is not limited in the embodiment of the present disclosure, as long as the preset weight value is a numerical value greater than 0 and less than 1.

Exemplarily, the lens smoothing penalty function can be used for characterizing a shift degree between locations of the candidate cropping boxes in the two target video frames, and an expression of the lens smoothing penalty function can be: $|L(C_i) - L(C_{i-1})|$, where $L(C_i)$ denotes a location of the candidate cropping box $C_i$ corresponding to the i th target video frame, and $L(C_{i-1})$ denotes a location of the candidate cropping box $C_{i-1}$ corresponding to the (i−1)th target video frame. Alternatively, a weight intervention can be added to the lens smoothing penalty function to facilitate the calculation, that is, the expression of the lens smoothing penalty function can also be: $\lambda_3 \cdot |L(C_i) - L(C_{i-1})|$. Where $\lambda_3$ denotes a preset weight value, a numerical value of $\lambda_2$ can be set according to an actual situation, which is not limited in the embodiment of the present disclosure, as long as the preset weight value is a numerical value greater than 0 and less than 1.

To sum up, an expression of the cost function in the embodiment of the present disclosure can be:

$$F = \sum_{i=1}^{n} \left( 1 - \left( \beta_1 \frac{A(C_i)}{S(C_i)} + \beta_2 \frac{A(C_i)}{A(I_i)} \right) \right) + \lambda_1 \cdot (|W_i - W_{i-1}| + |H_i - H_{i-1}|) + \lambda_2 \cdot (x(1-x)) + \lambda_3 \cdot |L(C_i) - L(C_{i-1})|$$

where F denotes a calculation result of the cost function, and n denotes a number of the target video frames obtained by the frame extraction processing.

In an embodiment of the present disclosure, a target candidate cropping box that minimizes the calculation result of the cost function can be determined among the plurality of candidate cropping boxes corresponding to the target video frame. This process can be understood as a dynamic programming process, that is, each of the target video frames has a plurality of states (i.e., each of the target video frames corresponds to a plurality of candidate cropping boxes), each state has one score (i.e., the calculation result of the cost function), and a transition between different states between different frames will have one transition penalty.

In a specific application, calculation can be performed for each of the candidate cropping boxes of each of the target video frames according to the above expression of the cost function, to determine a state of each of the candidate cropping boxes. Then, a state transition penalty between different frames is calculated, and a corresponding state of a previous frame that minimizes a calculation result of its cost function is recorded for each state. The state transition penalty can be understood as a location offset and size difference between candidate cropping boxes between the different frames. That is to say, for each candidate cropping box in the second target video frame, a candidate cropping box that minimizes a calculation result of the cost function of the candidate cropping box is determined in the first target video frame. The first target video frame is an adjacent previous one video frame of the second target video frame. Therefore, each of the candidate cropping boxes has a corresponding previous one frame's candidate cropping box with a minimum calculation result of the cost function. Then, starting from an nth target video frame, a candidate cropping box that minimizes a calculation result of its cost function is determined in an (n−1)th target video frame, then for the (n−1)th target video frame, a candidate cropping box that minimizes a calculation result of its cost function is determined in an (n−2)th target video frame, and so on, for each of the target video frames, a target candidate cropping box that minimizes a calculation result of its cost function can be determined, and the target candidate cropping box can minimize an overall cost function, so that the target candidate cropping box can include the main content, and the transition between the cropping boxes between the different target video frames is smooth, which can upgrade quality of the video cropping.

In a possible implementation, after the original video is cropped according to the target cropping box corresponding to the each frame picture, a cropping width and a cropping length corresponding to the original video can also be acquired, and then border padding is performed on the cropped each frame picture, so that a width of the cropped each frame picture is the cropping width and a length of the cropped each frame picture is the cropping length.

Exemplarily, the cropping width can be a desired cropping width entered by the user, and the cropping length can be a desired cropping length entered by the user, which are not limited in the embodiment of the present disclosure. Since the target cropping box corresponding to the each frame picture is determined according to the main content, and a size of the main content may be different, the size of the target cropping box corresponding to the each frame picture will be different, and may also be different from the desired cropping width and/or cropping length. Therefore, in order to obtain a cropped video with a uniform size, border padding can be performed on the cropped each frame picture so that the width of the cropped each frame picture is the cropping width, and the length of the cropped each frame picture is the cropping length. For example, black border padding can be performed on the cropped each frame picture, i.e., when the width of the cropped frame picture is less than the cropping width, black borders are padded on left and right sides of the frame picture, so that a sum of the black borders and the width of the cropped frame picture is equal to the cropping width.

Alternatively, in another possible implementation, in the case where the width of the cropped frame picture is the cropping width and the length thereof exceeds the cropping length, or in the case where the length of the cropped frame picture is the cropping length and the width thereof exceeds the cropping width, the cropped frame picture can be zoomed first so that the width does not exceed the cropping width and the length does not exceed the cropping length, and then border padding can be performed so that the cropped video is in the uniform size.

By use of the above video cropping method, the target candidate cropping box corresponding to each of the target video frames can be dynamically determined according to the main content in each of the target video frames, so that different target cropping boxes for the each frame picture can be determined by the interpolation processing, such that the target cropping box corresponding to the each frame picture includes most of the main content in the each frame picture, which improves loss of most of the main content in the cropped video, and upgrades quality of the video cropping. Moreover, the border padding can be performed on the cropped each frame picture to obtain the cropped video with the target size.

Figure 4:
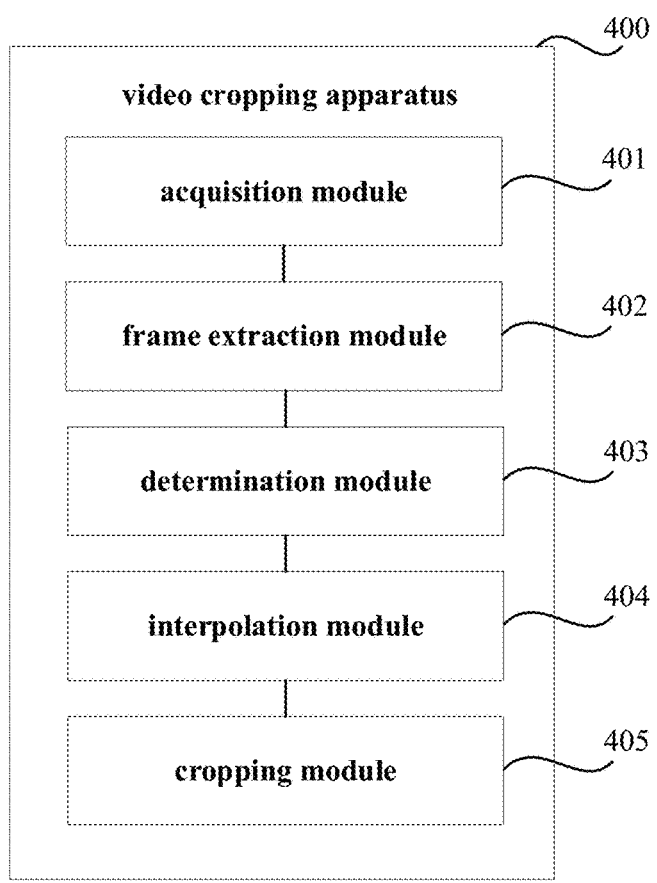
FIG. 4 is a block diagram illustrating a video cropping apparatus according to one exemplary embodiment of the present disclosure.

Based on the same inventive concept, an embodiment of the present disclosure further provides a video cropping apparatus, which can become a part or all of an electronic device by software, hardware, or a combination thereof. Referring to FIG. 4, the video cropping apparatus comprises:

an acquisition module 401 configured to acquire an original video to be cropped;

a frame extraction module 402 configured to perform frame extraction processing on the original video to obtain a plurality of target video frames;

a determination module 403 configured to determine, for each of the target video frames, a target candidate cropping box corresponding to the target video frame according to a main content in the target video frame;

an interpolation module 404 configured to perform interpolation processing according to the target candidate cropping box corresponding to each of the target video frames to determine a target cropping box corresponding to each frame picture in the original video; and a cropping module 405 configured to crop the original video according to the target cropping box corresponding to the each frame picture.

Alternatively, the determination module 403 is configured to:

calculate, for each of the target video frames, a cost function according to the main content in the target video frame and a plurality of candidate cropping boxes corresponding to the target video frame, the cost function comprising a first function for characterizing importance of the main content in the target video frame and a second function for characterizing a size difference between candidate cropping boxes in two of the target video frames; and determine, among the plurality of candidate cropping boxes, a target candidate cropping box that minimizes a calculation result of the cost function.

Alternatively, the first function is calculated by:

a content determination module configured to determine, for each of the candidate cropping boxes, a content inclusion degree of the candidate cropping box to the main content in the target video frame, and determine a content proportion between the main content included in the candidate cropping box and the complete main content in the target video frame; and a first calculation module configured to calculate the first function according to the content inclusion degree and the content proportion.

Alternatively, an expression of the first function is:

$$f = 1 - \left( \beta_1 \frac{A(C_i)}{S(C_i)} + \beta_2 \frac{A(C_i)}{A(I_i)} \right)$$

where $f$ denotes a calculation result of the first function, $\beta_1$ and $\beta_2$ denote preset weight values, $A(C_i)$ denotes a main content included in a candidate cropping box $C_i$ corresponding to an ith target video frame, $S(C_i)$ denotes an area of the candidate cropping box $C_i$ corresponding to the ith target video frame, $A(I_i)$ denotes a complete main content in the ith target video frame, $$\frac{A(C_i)}{S(C_i)}$$

denotes a content inclusion degree of the candidate cropping box $C_i$ corresponding to the ith target video frame to the main content in the ith target video frame, and $$\frac{A(C_i)}{A(I_i)}$$

denotes a content proportion between the main content included in the candidate cropping box $C_i$ corresponding to the ith target video frame and the complete main content in the ith target video frame.

Alternatively, the second function is calculated by:
a difference determination module configured to determine a width difference and a length difference between a candidate cropping box in a first target video frame and a candidate cropping box in a second target video frame, wherein the first target video frame is an adjacent previous one video frame of the second target video frame; and
a second calculation module configured to calculate the second function according to the width difference and the length difference.

Alternatively, the interpolation module 404 is configured to:
perform smoothing processing according to the target candidate cropping box corresponding to each of the target video frames to obtain a smooth candidate cropping box corresponding to each of the target video frames; and
performing interpolation processing according to the smooth candidate cropping box corresponding to each of the target video frames to obtain the target cropping box corresponding to the each frame picture in the original video.

Alternatively, the apparatus 400 further comprises:
a length and width acquisition module configured to acquire a cropping width and a cropping length corresponding to the original video; and
a padding module configured to perform border padding on cropped each frame picture, so that a width of the cropped each frame picture is the cropping width and a length of the cropped each frame picture is the cropping length.

With regard to the apparatus in the above embodiment, the specific manner in which each module performs the operation has been described in detail in the embodiments related to the method, which will not be described in detail here.

Based on the same inventive concept, an embodiment of the present disclosure further provides a computer-readable medium having stored thereon computer programs which, when executed by a processing means, implement the steps of any of the above video cropping methods.

Based on the same inventive concept, an embodiment of the present disclosure further provides an electronic device, comprising:
a storage means having computer programs stored thereon; and
a processing means configured to execute the computer programs in the storage means to implement the steps of any of the above video cropping methods.

Figure 5:
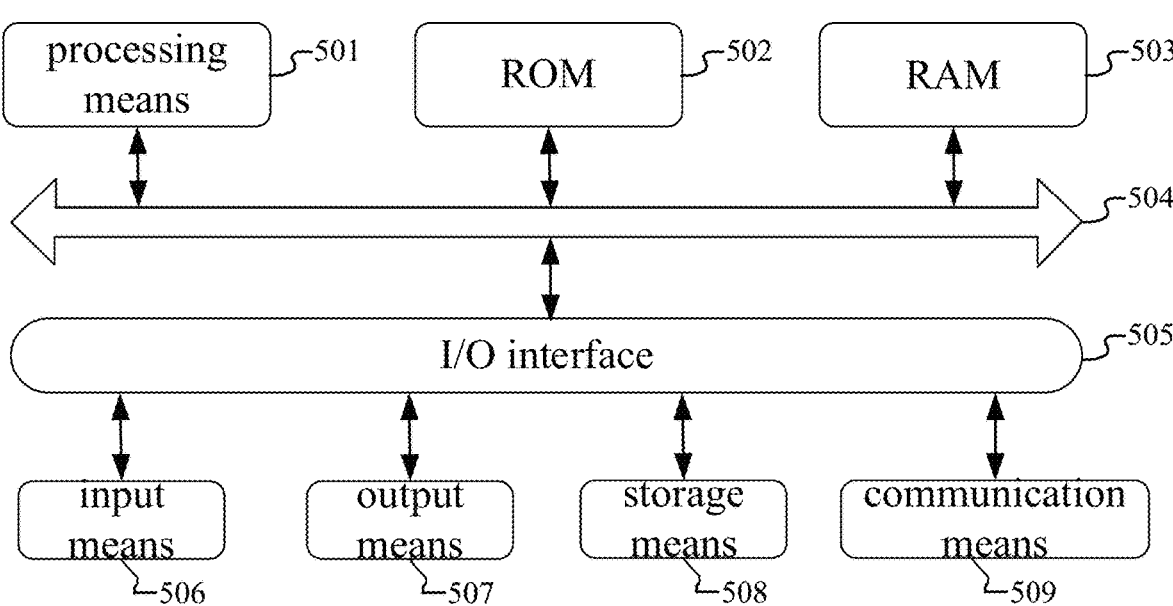
FIG. 5 is a block diagram illustrating an electronic device according to one exemplary embodiment of the present disclosure.

Reference is made below to FIG. 5, which illustrates a schematic structural diagram of an electronic device 500 suitable for implementing an embodiment of the present disclosure. A terminal device in the embodiment of the present disclosure can include, but is not limited to, a mobile terminal such as a mobile phone, a notebook computer, a digital broadcast receiver, a PDA (Personal Digital Assistant), a PAD (tablet computer), a PMP (Portable Multimedia Player), and a vehicle-mounted terminal (e.g., a vehicle-mounted navigation terminal), and a fixed terminal such as a digital TV, and a desktop computer. The electronic device shown in FIG. 5 is only one example, and should not bring any limitation to the function and the use scope of the embodiment of the present disclosure.

As shown in FIG. 5, the electronic device 500 can include a processing means (e.g., central processing unit, graphics processing unit, etc.) 501, which can perform various appropriate actions and processes according to a program stored in a read-only memory (ROM) 502 or a program loaded from a storage means 508 into a random access memory (RAM) 503. In the RAM 503, various programs and data required for operations of the electronic device 500 are also stored. The processing means 501, the ROM 502, and the RAM 503 are connected to each other through a bus 504. An input/output (I/O) interface 505 is also connected to bus 504.

Generally, the following means can be connected to the I/O interface 505: an input means 506 including, for example, a touch screen, touch pad, keyboard, mouse, camera, microphone, accelerometer, gyroscope; an output means 507 including, for example, a liquid crystal display (LCD), a speaker, a vibrator; the storage means 508 including, for example, a magnetic tape, hard disk; and a communication means 509. The communication means 509 can allow the electronic device 500 to be in wireless or wired communication with another device to exchange data. While FIG. 5 illustrates the electronic device 500 having the various means, it should be understood that it is not demanded that all the illustrated means are implemented or provided. More or less means can be alternatively implemented or provided.

In particular, according to the embodiment of the present disclosure, the processes described above with reference to the flow diagrams can be implemented as a computer software program. For example, the embodiment of the present disclosure comprises computer programs product, which comprises computer programs carried on a non-transitory computer-readable medium, the computer program containing program code for performing the method illustrated by the flow diagrams. In such an embodiment, the computer program can be downloaded and installed from a network via the communication means 509, or installed from the storage means 508, or installed from the ROM 502. When the computer program is executed by the processing means 501, the above functions defined in the method of the embodiment of the present disclosure are executed.

It should be noted that the above computer-readable medium of the present disclosure can be a computer-readable signal medium or a computer-readable storage medium or any combination thereof. The computer-readable storage medium can be, for example, but not limited to, an electronic, magnetic, optical, electromagnetic, infrared, or semiconductor system, apparatus, or device, or any combination of the above. A more specific example of the computer-readable storage medium can include, but is not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage means, a magnetic storage means, or any suitable combination of the above. In the present disclosure, the computer-readable storage medium can be any tangible medium containing or storing a program that can be used by or in conjunction with an instruction execution system, apparatus, or device. However, in the present disclosure, the computer-readable signal medium can include a data signal propagated in baseband or as part of a carrier wave, in which computer-readable program code is carried. Such a propagated data signal can take any of a variety of forms, including, but not limited to, an electromagnetic signal, an optical signal, or any suitable combination of the above. The computer-readable signal medium can be any computer-readable medium other than the computer-readable storage medium, and the computer-readable signal medium can send, propagate, or transmit a program for use by or in conjunction with an instruction execution system, apparatus, or device. The program code contained on the computer-readable medium can be transmitted using any appropriate medium, including but not limited to: a wire, an optical cable, RF (radio frequency), etc., or any suitable combination of the above.

In some implementations, communication can be performed using any currently known or future developed network protocol, such as HTTP (HyperText Transfer Protocol), and interconnection with any form or medium of digital data communication (e.g., a communication network) can be performed. An example of the communication network includes a local area network ("LAN"), a wide area network ("WAN"), an internet (e.g., the Internet), and a peer-to-peer network (e.g., an ad hoc peer-to-peer network), as well as any currently known or future developed network.

The above computer-readable medium can be contained in the electronic device; or can be separate without being assembled into the electronic device.

The computer-readable medium has thereon carried one or more programs which, when executed by the electronic device, cause the electronic device to: acquire an original video to be cropped; perform frame extraction processing on the original video to obtain a plurality of target video frames; determining, for each of the target video frames, a target candidate cropping box corresponding to the target video frame according to a main content in the target video frame; performing interpolation processing according to the target candidate cropping box corresponding to each of the target video frames to determine a target cropping box corresponding to each frame picture in the original video; and cropping the original video according to the target cropping box corresponding to the each frame picture.

Computer program code for performing the operations of the present disclosure can be written in one or more programming languages or any combination thereof, the above programming language including but not limited to an object-oriented programming language such as Java, Smalltalk, C++, and including a conventional procedural programming language, such as the "C" programming language or a similar programming language. The program code can be executed entirely on a user's computer, partly on the user's computer, as a stand-alone software package, partly on the user's computer and partly on a remote computer, or entirely on the remote computer or server. In a scenario where the remote computer is involved, the remote computer can be connected to the user's computer through any type of network, including a local area network (LAN) or a wide area network (WAN), or can be connected to an external computer (for example, through the Internet using an Internet service provider).

The flow diagrams and block diagrams in the accompanying drawings illustrate the possibly implemented architecture, functions, and operations of the systems, methods and computer program products according to the various embodiments of the present disclosure. In this regard, each block in the flow diagrams or block diagrams can represent one module, program segment, or portion of code, which comprises one or more executable instructions for realizing a specified logical function. It should also be noted that, in some alternative implementations, the functions noted in the blocks can occur in a different order from those noted in the drawings. For example, two blocks shown in succession can, in fact, be executed substantially concurrently, and they can be executed in a reverse order sometimes, which depends upon the functions involved. It will also be noted that each block of the block diagrams and/or flow diagrams, and a combination of blocks in the block diagrams and/or flow diagrams, can be implemented using a special-purpose hardware-based system that performs specified functions or operations, or using a combination of special-purpose hardware and computer instructions.

The involved modules described in the embodiments of the present disclosure can be implemented by software or hardware. The name of the module does not, in some cases, constitute a limitation to the module itself.

The functions described above herein can be at least partially performed by one or more hardware logic components. For example, without limitation, hardware logic components of exemplary types that can be used include: a field programmable gate array (FPGA), an application specific integrated circuit (ASIC), an application specific standard product (ASSP), a system on chip (SOC), a complex programmable logic device (CPLD), and the like.

In the context of this disclosure, a machine-readable medium can be a tangible medium, which can contain, or store a program for use by or in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the above. A more specific example of the machine-readable storage medium would include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage means, a magnetic storage means, or any suitable combination of the above.

According to one or more embodiments of the present disclosure, example 1 provides a video cropping method, comprising:

acquiring an original video to be cropped;

performing frame extraction processing on the original video to obtain a plurality of target video frames;

determining, for each of the target video frames, a target candidate cropping box corresponding to the target video frame according to a main content in the target video frame;

performing interpolation processing according to the target candidate cropping box corresponding to each of the target video frames to determine a target cropping box corresponding to each frame picture in the original video; and cropping the original video according to the target cropping box corresponding to the each frame picture.

According to one or more embodiments of the present disclosure, example 2 provides the method of example 1, wherein the determining, for each of the target video frames, a target candidate cropping box corresponding to the target video frame according to a main content in the target video frame comprises:

calculating, for each of the target video frames, a cost function according to the main content in the target video frame and a plurality of candidate cropping boxes corresponding to the target video frame, the cost function comprising a first function for characterizing importance of the main content in the target video frame and a second function for characterizing a size difference between candidate cropping boxes in two of the target video frames; and determining, among the plurality of candidate cropping boxes, a target candidate cropping box that minimizes a calculation result of the cost function.

According to one or more embodiments of the present disclosure, example 3 provides the method of example 2, wherein the first function is calculated by:

determining, for each of the candidate cropping boxes, a content inclusion degree of the candidate cropping box to the main content in the target video frame, and determining a content proportion between the main content included in the candidate cropping box and the complete main content in the target video frame; and calculating the first function according to the content inclusion degree and the content proportion.

According to one or more embodiments of the present disclosure, example 4 provides the method of example 3, wherein an expression of the first function is:

$$f = 1 - \left( \beta_1 \frac{A(C_i)}{S(C_i)} + \beta_2 \frac{A(C_i)}{A(I_i)} \right)$$

where $f$ denotes a calculation result of the first function, $\beta_1$ and $\beta_2$ denote preset weight values, $A(C_i)$ denotes a main content included in a candidate cropping box $C_i$ corresponding to an ith target video frame, $S(C_i)$ denotes an area of the candidate cropping box $C_i$ corresponding to the ith target video frame, $A(I_i)$ denotes a complete main content in the ith target video frame, $$\frac{A(C_i)}{S(C_i)}$$

denotes a content inclusion degree of the candidate cropping box $C_i$ corresponding to the ith target video frame to the main content in the ith target video frame, and $$\frac{A(C_i)}{A(I_i)}$$

denotes a content proportion between the main content included in the candidate cropping box C corresponding to the ith target video frame and the complete main content in the ith target video frame.

According to one or more embodiments of the present disclosure, example 5 provides the method of example 2, wherein the second function is calculated by:

determining a width difference and a length difference between a candidate cropping box in a first target video frame and a candidate cropping box in a second target video frame, wherein the first target video frame is an adjacent previous one video frame of the second target video frame; and calculating the second function according to the width difference and the length difference.

According to one or more embodiments of the present disclosure, example 6 provides the method of any of examples 1 to 5, wherein the performing interpolation processing according to the target candidate cropping box corresponding to each of the target video frames to determine a target cropping box corresponding to each frame picture in the original video comprises:

performing smoothing processing according to the target candidate cropping box corresponding to each of the target video frames to obtain a smooth candidate cropping box corresponding to each of the target video frames; and performing interpolation processing according to the smooth candidate cropping box corresponding to each of the target video frames to obtain the target cropping box corresponding to the each frame picture in the original video.

According to one or more embodiments of the present disclosure, example 7 provides the method of any of examples 1 to 5, wherein the method further comprises:

acquiring a cropping width and a cropping length corresponding to the original video; and performing border padding on cropped each frame picture, so that a width of the cropped each frame picture is the cropping width and a length of the cropped each frame picture is the cropping length.

According to one or more embodiments of the present disclosure, example 8 provides a video cropping apparatus, comprising:

an acquisition module configured to acquire an original video to be cropped;

a frame extraction module configured to perform frame extraction processing on the original video to obtain a plurality of target video frames;

a determination module configured to determine, for each of the target video frames, a target candidate cropping box corresponding to the target video frame according to a main content in the target video frame;

an interpolation module configured to perform interpolation processing according to the target candidate cropping box corresponding to each of the target video frames to determine a target cropping box corresponding to each frame picture in the original video; and a cropping module configured to crop the original video according to the target cropping box corresponding to the each frame picture.

According to one or more embodiments of the present disclosure, example 9 provides the apparatus of example 8, wherein the determination module is configured to:

calculate, for each of the target video frames, a cost function according to the main content in the target video frame and a plurality of candidate cropping boxes corresponding to the target video frame, the cost function comprising a first function for characterizing importance of the main content in the target video frame and a second function for characterizing a size difference between candidate cropping boxes in two of the target video frames; and determine, among the plurality of candidate cropping boxes, a target candidate cropping box that minimizes a calculation result of the cost function.

According to one or more embodiments of the present disclosure, example 10 provides the apparatus of example 9, wherein the first function is calculated by:

a content determination module configured to determine, for each of the candidate cropping boxes, a content inclusion degree of the candidate cropping box to the main content in the target video frame, and determine a content proportion between the main content included in the candidate cropping box and the complete main content in the target video frame; and a first calculation module configured to calculate the first function according to the content inclusion degree and the content proportion.

According to one or more embodiments of the present disclosure, example 11 provides the apparatus of example 10, wherein an expression of the first function is:

$$f = 1 - \left( \beta_1 \frac{A(C_i)}{S(C_i)} + \beta_2 \frac{A(C_i)}{A(I_i)} \right)$$

where $f$ denotes a calculation result of the first function, $\beta_1$ and $\beta_2$ denote preset weight values, $A(C_i)$ denotes a main content included in a candidate cropping box $C_i$ corresponding to an ith target video frame, $S(C_i)$ denotes an area of the candidate cropping box $C_i$ corresponding to the ith target video frame, $A(I_i)$ denotes a complete main content in the ith target video frame, $$\frac{A(C_i)}{S(C_i)}$$

denotes a content inclusion degree of the candidate cropping box $C_i$ corresponding to the ith target video frame to the main content in the ith target video frame, and $$\frac{A(C_i)}{A(I_i)}$$

denotes a content proportion between the main content included in the candidate cropping box $C_i$ corresponding to the ith target video frame and the complete main content in the ith target video frame.

According to one or more embodiments of the present disclosure, example 12 provides the apparatus of example 9, wherein the second function is calculated by:

a difference determination module configured to determine a width difference and a length difference between a candidate cropping box in a first target video frame and a candidate cropping box in a second target video frame, wherein the first target video frame is an adjacent previous one video frame of the second target video frame; and a second calculation module configured to calculate the second function according to the width difference and the length difference.

According to one or more embodiments of the present disclosure, example 13 provides the apparatus of any of examples 8 to 12, wherein the interpolation module is configured to:

perform smoothing processing according to the target candidate cropping box corresponding to each of the target video frames to obtain a smooth candidate cropping box corresponding to each of the target video frames; and perform interpolation processing according to the smooth candidate cropping box corresponding to each of the target video frames to obtain the target cropping box corresponding to the each frame picture in the original video.

According to one or more embodiments of the present disclosure, example 14 provides the apparatus of any of examples 8 to 12, further comprising:

a length and width acquisition module configured to acquire a cropping width and a cropping length corresponding to the original video; and a padding module configured to perform border padding on cropped each frame picture, so that a width of the cropped each frame picture is the cropping width and a length of the cropped each frame picture is the cropping length.

According to one or more embodiments of the present disclosure, example 15 provides a computer-readable medium having stored thereon computer programs which, when executed by a processing means, implement the steps of the method of any of examples 1 to 7.

According to one or more embodiments of the present disclosure, example 16 provides an electronic device, comprising:

a storage means having computer programs stored thereon; and a processing means configured to execute the computer programs in the storage means to implement the steps of the method of any of examples 1 to 7.

The above description is only preferred embodiments of the present disclosure and explanations of technical principles used. It should be appreciated by those skilled in the art that the disclosed scope involved in the present disclosure is not limited to a technical solution formed by a specific combination of the above technical features, but also should cover other technical solutions formed by an arbitrary combination of the above technical features or their equivalent features without departing from the above disclosed concept, for example, a technical solution formed by performing mutual replacement between the above features and technical features having similar functions with those disclosed (but not limited to) in this disclosure.

Furthermore, while operations are depicted in a specific order, this should not be understood as requiring that these operations be performed in the specific order shown or in a sequential order. Under a certain circumstance, multitasking and parallel processing may be advantageous. Likewise, while several specific implementation details are included in the above discussion, these should not be construed as limitations to the scope of the present disclosure. Certain features that are described in the context of separate embodiments can also be implemented in combination in a single embodiment. Conversely, various features that are described in the context of a single embodiment can also be implemented separately or in any suitable sub-combination in multiple embodiments.

Although the subject matter has been described in language specific to structural features and/or method logic actions, it should be understood that the subject matter defined in the attached claims is not necessarily limited to the specific features or actions described above. Conversely, the specific features and actions described above are only exemplary forms of implementing the claims. With regard to the apparatus in the above embodiment, the specific manner in which each module performs the operation has been described in detail in the embodiment related to the method, and will not be described in detail here.

What is claimed is:

1. A video cropping method, comprising:
acquiring an original video to be cropped;
performing frame extraction processing on the original video to obtain a plurality of target video frames;
calculating, for each target video frame of the target video frames, a cost function according to a main content in the target video frame and a plurality of candidate cropping boxes corresponding to the target video frame, the cost function comprising a first function for characterizing importance of the main content in the target video frame and a second function for characterizing a size difference between candidate cropping boxes in two of the target video frames;
determining, among the plurality of candidate cropping boxes, a target candidate cropping box that minimizes a calculation result of the cost function;
performing interpolation processing according to the target candidate cropping box corresponding to each target video frame of the target video frames to determine a target cropping box corresponding to each frame picture in the original video; and
cropping the original video according to the target cropping box corresponding to each frame picture,
wherein the first function is calculated by:
determining, for each candidate cropping box of the candidate cropping boxes, a content inclusion degree of the candidate cropping box to the main content in the target video frame, and determining a content proportion between the main content included in the candidate cropping box and the complete main content in the target video frame; and
calculating the first function according to the content inclusion degree and the content proportion.

2. The method according to claim 1, wherein an expression of the first function is:

$$ f = 1 - \left( \beta_1 \frac{A(C_i)}{S(C_i)} + \beta_2 \frac{A(C_i)}{A(I_i)} \right) $$

where $f$ denotes a calculation result of the first function, $\beta_1$ and $\beta_2$ denote preset weight values, $A(C_i)$ denotes a main content included in a candidate cropping box $C_i$ corresponding to an ith target video frame, $S(C_i)$ denotes an area of the candidate cropping box $C_i$ corresponding to the ith target video frame, $A(I_i)$ denotes a complete main content in the ith target video frame, $$ \frac{A(C_i)}{S(C_i)} $$

denotes a content inclusion degree of the candidate cropping box $C_i$ corresponding to the ith target video frame to the main content in the ith target video frame, and $$ \frac{A(C_i)}{A(I_i)} $$

denotes a content proportion between the main content included in the candidate cropping box $C_i$ corresponding to the ith target video frame and the complete main content in the ith target video frame.

3. The method according to claim 1, wherein the second function is calculated by:
determining a width difference and a length difference between a candidate cropping box in a first target video frame and a candidate cropping box in a second target video frame, wherein the first target video frame is an adjacent previous one video frame of the second target video frame; and
calculating the second function according to the width difference and the length difference.

4. The method according to claim 1, wherein performing the interpolation processing according to the target candidate cropping box corresponding to each target video frame of the target video frames to determine the target cropping box corresponding to each frame picture in the original video comprises:
performing smoothing processing according to the target candidate cropping box corresponding to each target video frame of the target video frames to obtain a smooth candidate cropping box corresponding to each target video frame of the target video frames; and
performing interpolation processing according to the smooth candidate cropping box corresponding to each target video frame of the target video frames to obtain the target cropping box corresponding to each frame picture in the original video.

5. The method according to claim 1, wherein the method further comprises:
acquiring a cropping width and a cropping length corresponding to the original video; and
performing border padding on each cropped frame picture, so that a width of each cropped frame picture is the cropping width and a length of each cropped frame picture is the cropping length.

6. A non-transitory computer-readable medium having stored thereon computer programs which, when executed by a processing means, execute the instructions of:
acquiring an original video to be cropped;
performing frame extraction processing on the original video to obtain a plurality of target video frames;
calculating, for each target video frame of the target video frames, a cost function according to a main content in the target video frame and a plurality of candidate cropping boxes corresponding to the target video frame, the cost function comprising a first function for characterizing importance of the main content in the target video frame and a second function for characterizing a size difference between candidate cropping boxes in two of the target video frames;

determining, among the plurality of candidate cropping boxes, a target candidate cropping box that minimizes a calculation result of the cost function;

performing interpolation processing according to the target candidate cropping box corresponding to each target video frame of the target video frames to determine a target cropping box corresponding to each frame picture in the original video; and cropping the original video according to the target cropping box corresponding to each frame picture, wherein the first function is calculated by:

determining, for each candidate cropping box of the candidate cropping boxes, a content inclusion degree of the candidate cropping box to the main content in the target video frame, and determining a content proportion between the main content included in the candidate cropping box and the complete main content in the target video frame; and calculating the first function according to the content inclusion degree and the content proportion.

7. An electronic device, comprising:

a storage means having computer programs stored thereon; and a processing means configured to execute the computer programs in the storage means to execute the instructions of:

acquiring an original video to be cropped;

performing frame extraction processing on the original video to obtain a plurality of target video frames;

calculating, for each target video frame of the target video frames, a cost function according to a main content in the target video frame and a plurality of candidate cropping boxes corresponding to the target video frame, the cost function comprising a first function for characterizing importance of the main content in the target video frame and a second function for characterizing a size difference between candidate cropping boxes in two of the target video frames;

determining, among the plurality of candidate cropping boxes, a target candidate cropping box that minimizes a calculation result of the cost function;

performing interpolation processing according to the target candidate cropping box corresponding to each target video frame of the target video frames to determine a target cropping box corresponding to each frame picture in the original video; and cropping the original video according to the target cropping box corresponding to each frame picture, wherein the first function is calculated by:

determining, for each candidate cropping box of the candidate cropping boxes, a content inclusion degree of the candidate cropping box to the main content in the target video frame, and determining a content proportion between the main content included in the candidate cropping box and the complete main content in the target video frame; and calculating the first function according to the content inclusion degree and the content proportion.

8. The electronic device according to claim 7, wherein an expression of the first function is:

$$f = 1 - \left( \beta_1 \frac{A(C_i)}{S(C_i)} + \beta_2 \frac{A(C_i)}{A(I_i)} \right)$$

where $f$ denotes a calculation result of the first function, $\beta_1$ and $\beta_2$ denote preset weight values, $A(C_i)$ denotes a main content included in a candidate cropping box $C_i$ corresponding to an ith target video frame, $S(C_i)$ denotes an area of the candidate cropping box $C_i$ corresponding to the ith target video frame, $A(I_i)$ denotes a complete main content in the ith target video frame, $$\frac{A(C_i)}{S(C_i)}$$

denotes a content inclusion degree of the candidate cropping box $C_i$ corresponding to the ith target video frame to the main content in the ith target video frame, and $$\frac{A(C_i)}{A(I_i)}$$

denotes a content proportion between the main content included in the candidate cropping box $C_i$ corresponding to the ith target video frame and the complete main content in the ith target video frame.

9. The electronic device according to claim 7, wherein the second function is calculated by:

determining a width difference and a length difference between a candidate cropping box in a first target video frame and a candidate cropping box in a second target video frame, wherein the first target video frame is an adjacent previous one video frame of the second target video frame; and calculating the second function according to the width difference and the length difference.

10. The electronic device according to claim 7, wherein performing the interpolation processing according to the target candidate cropping box corresponding to each target video frame of the target video frames to determine the target cropping box corresponding to each frame picture in the original video comprises:

performing smoothing processing according to the target candidate cropping box corresponding to each target video frame of the target video frames to obtain a smooth candidate cropping box corresponding to each target video frame of the target video frames; and performing interpolation processing according to the smooth candidate cropping box corresponding to each target video frame of the target video frames to obtain the target cropping box corresponding to each frame picture in the original video.

11. The electronic device according to claim 7, wherein the processing means is configured to execute the computer programs in the storage means to further execute the instructions of:

acquiring a cropping width and a cropping length corresponding to the original video; and performing border padding on each cropped frame picture, so that a width of each cropped frame picture is the cropping width and a length of each cropped frame picture is the cropping length.

* * * * *